June 13, 1939.  L. D. HILLYER  2,162,434
AGRICULTURAL MACHINE
Filed Nov. 2, 1937   2 Sheets-Sheet 1
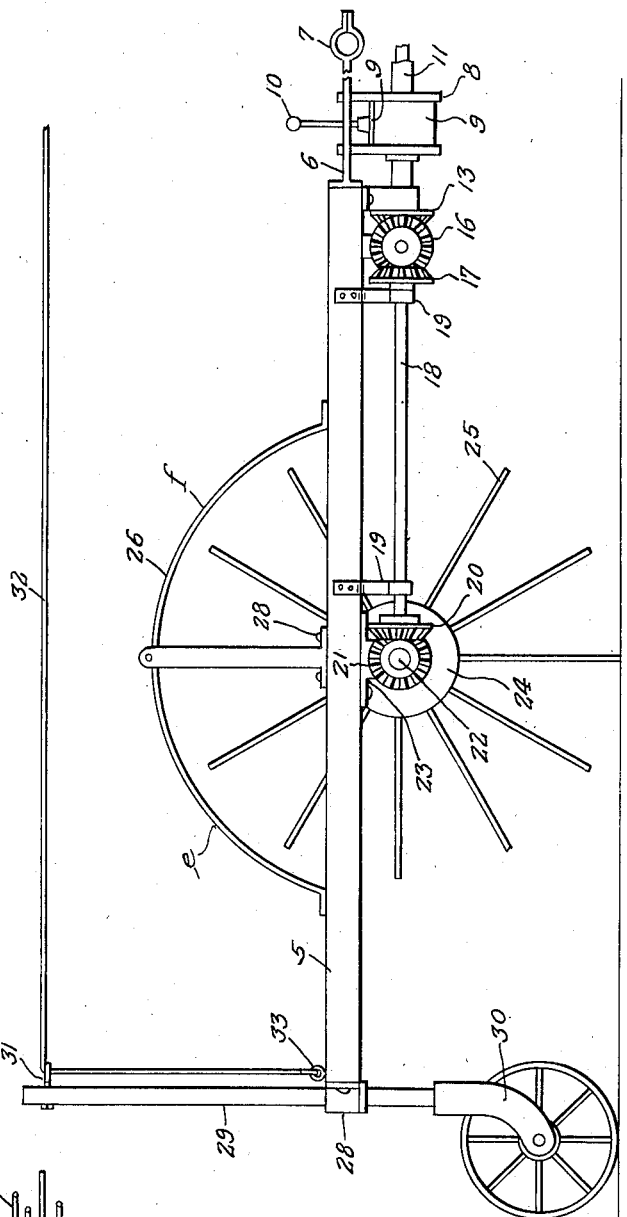
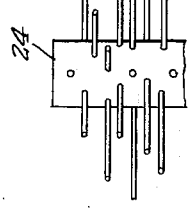
Inventor
*L. D. Hillyer*
By *Clarence A. O'Brien*
*Hyman Berman*
Attorneys

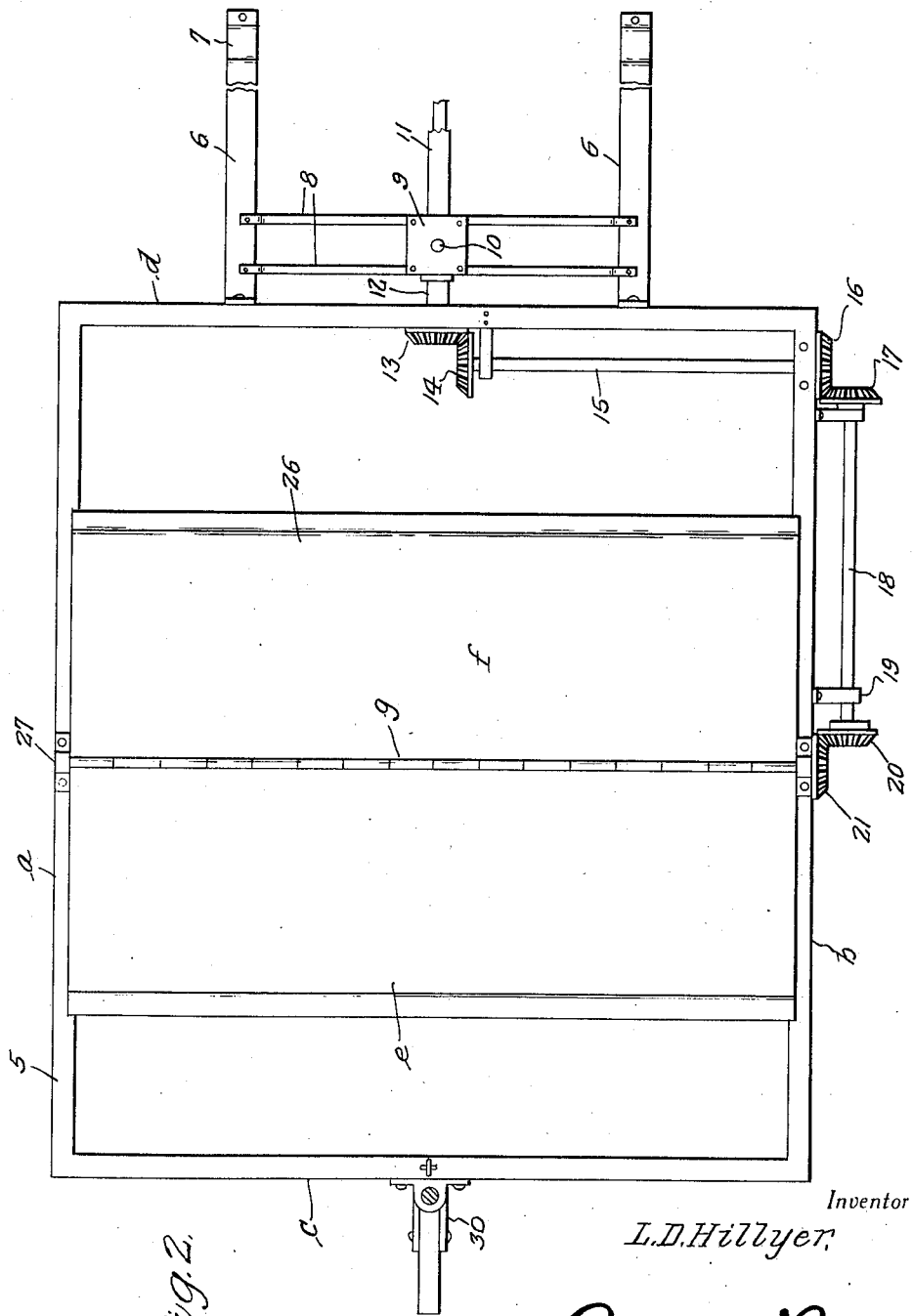

Patented June 13, 1939

2,162,434

UNITED STATES PATENT OFFICE 2,162,434

AGRICULTURAL MACHINE

Laurence D. Hillyer, Brownwood, Tex.

Application November 2, 1937, Serial No. 172,451

1 Claim. (Cl. 97—16)

This machine relates to new and useful improvements in agricultural machinery.

The principal object of the present invention is to provide a machine of the character stated which will serve not only as a weed and vermin destroyer but also as a cultivator.

Another important object of the invention is to provide a machine of the character stated, which will in operation perform its work by a beating or whipping action on the weeds, striking and destroying them together with vermin in reach of the actuated elements, and/or also perform its work by a beating or whipping action on the ground so as to break the crust and clods thereon.

Another important object of the invention is to provide a machine of the character named wherein the actuated elements will not be affected by stones, stumps, brush or other obstructions or unevenness of the ground.

Another important object of the invention is to provide a machine of the character stated wherein the actuated elements will do their work on and over uneven ground surfaces, along or across ditches and in rough terrain.

Another important object of the invention is to provide a machine of the character stated wherein the actuated elements will rotate or move so rapidly as to strike and destroy grasshoppers, boll weevils, insects, bugs, worms and other vermin on the surface of the soil, immediately below the surface, or in the air within reach of the actuated elements.

Another important object of the invention is to provide a machine of the character stated which in operation will do its work by means of force in the form of speedy and repeated blows rather than by cutting, plowing or harrowing by conventional methods.

Another important object of the invention is to provide a machine of the character stated which in operation as a cultivator with the use of suitable guards to protect the cultivated plants, will break the surface crust, kill weeds and grass down to the ground, and destroy vermin thereon, all in one operation, and without injury to either the root or the body of said cultivated crop.

Another important object of the invention is to destroy weeds, cactus, other noxious growths, and/or vermin, in territory rough, rocky, hilly, cut with ditches, littered with brush or other obstructions, and impractical to work in and on with conventional machinery.

Another important object of the invention is to provide a machine of the character stated, which, by raising it to a suitable height, will destroy weeds, cactus, other noxious growths, and/or vermin, in pastures without material injury to pasture grasses.

These and various other important objects and advantages of the invention will become apparent to the reader of the following specification.

In the drawings:

Figure 1 represents a side elevational view of the machine.

Figure 2 is a top plan view of the machine.

Figure 3 is a fragmentary top plan view of the beater.

Referring to the drawings wherein like numerals designate like parts, it can be seen that numeral 5 denotes a substantially rectangular-shaped frame having the side members a—b and the end members c—d.

Extending forwardly from the end members d are the bars 6—6 which are provided with clamps 7 at their front ends for attachment to a tractor or other powered vehicle, suitable for pulling this agricultural machine.

Numerals 8 denote a pair of strap members bridging the bars 6 and adapted to support or assist in supporting the transmission 9 from which the gear shift lever 10 extends. Numeral 11 represents the drive shaft to the transmission 9 while numeral 12 denotes the driven shaft which extends through the end member d of the frame 5 and is equipped with the bevel gear 13 meshing with the bevel gear 14 on the countershaft 15. The shaft is supported in a transverse position with respect to the frame 5 and has the gear 16 thereon meshing with the gear 17 carried by the secondary countershaft 18 which shaft is journaled through bearings 19 and has the second gear 20 thereon meshing with the beveled gear 21 on the shaft 22 which extends transversely across the frame 5 and through suitable bearing means 23. On this shaft 22 is the drum 24 and radiating from this drum is a multiplicity of flexible wire, chain or cable members 25, the outer or striking end thereof being left plain or having attached thereto suitable tools to strike, cut, beat and destroy weeds, grasshoppers, insects, bugs, worms and other vermin. These flexible members will stand at right angles to the drum when same is in motion and will flex as they strike against the ground or objects they cannot cut through and/or destroy.

Disposed over the upper portion of the beating unit is the hood 26 which is made in a pair of sections e—f hingedly connected together as at g. The rod of this hinged connection g has its ends disposed into the posts 27 which in turn are secured as at 28 to the side members a—b of the frame 5. A guide 28 is provided on the rear end c of the frame 5 and receives slidably the vertically extending shank 29 of the caster wheel assembly 30.

The upper end of the shank 29 is provided with a guide eye and pulley 31 through which the control cable 32 extends, this control cable being secured at its rear end as at 33 to the frame 5 and obviously when this cable 32 is pulled from its forward end portion the frame 5 is caused to rise on the shank 29 thus varying the relationship of the flexible wire, chain or cable members 25 of the beater with respect to the ground.

While the foregoing specification sets forth the invention in specific terms, it is to be understood that numerous changes in the shape, size and materials may be resorted to without departing from the spirit and scope of the invention as claimed hereinafter.

While the foregoing specification sets forth the invention in specific terms, it is understood that the flexible members and/or the striking ends thereof may be of various sizes, weights and shapes to effect the particular work desired from said machine; that these may be attached to, detached from, said drum as the work may require, or as wear and tear may demand, without departing from the spirit and scope of the invention as claimed hereinafter.

Having described the invention, what is claimed as new is:

A weed destroying machine for attachment to a motor tractor as a trailer comprising a substantially rectangular frame, a coupling mounted on one end of the frame for attaching the same to the tractor for vertical swinging movement relative thereto, a castor wheel mounted on the other end of the frame and having a shank on which said end of the frame is vertically adjustable, a rotary beating assembly including a roller rotatably mounted on said frame and flexible beating elements extending from said roller, a drive for said roller mounted on said frame and including a transmission adapted to be driven by the motor of the tractor, and manipulative means for adjusting said frame on said shank to cause said flexible element to clear the ground and thereby destroy the weeds above the ground with a lacerating action.

LAURENCE D. HILLYER.